United States Patent
Duarte et al.

(10) Patent No.: US 9,489,107 B2
(45) Date of Patent: Nov. 8, 2016

(54) NAVIGATING AMONG ACTIVITIES IN A COMPUTING DEVICE

(75) Inventors: Matias Gonzalo Duarte, Sunnyvale, CA (US); Daniel Marc Gatan Shiplacoff, Los Angeles, CA (US); Jeremy Godfrey Lyon, Sunnyvale, CA (US); Paul Mercer, Palo Alto, CA (US); Ralph Thomas, Palo Alto, CA (US)

(73) Assignee: QUALCOMM Incorporated, San Diego, CA (US)

(*) Notice: Subject to any disclaimer, the term of this patent is extended or adjusted under 35 U.S.C. 154(b) by 1102 days.

(21) Appl. No.: 13/316,004

(22) Filed: Dec. 9, 2011

(65) Prior Publication Data

US 2012/0084711 A1 Apr. 5, 2012

Related U.S. Application Data

(62) Division of application No. 12/126,145, filed on May 23, 2008, now Pat. No. 8,296,684.

(51) Int. Cl.
*G06F 3/0481* (2013.01)
*G06F 3/0482* (2013.01)
*G06F 3/01* (2006.01)
(Continued)

(52) U.S. Cl.
CPC ............ *G06F 3/0482* (2013.01); *G06F 3/017* (2013.01); *G06F 3/0481* (2013.01); *G06F 3/0483* (2013.01); *G06F 3/0485* (2013.01); *G06F 9/4443* (2013.01); *H04L 41/22* (2013.01)

(58) Field of Classification Search
CPC ............ G06F 3/04812; G06F 3/0482; G06F 3/0488; G06F 3/017; H04L 41/22; H04L 41/12; G09G 2340/145
See application file for complete search history.

(56) References Cited

U.S. PATENT DOCUMENTS

| 4,680,577 A | 7/1987 | Straayer et al. |
| 5,146,556 A | 9/1992 | Hullot et al. |

(Continued)

FOREIGN PATENT DOCUMENTS

| AU | 2008100003 A4 | 2/2008 |
| CN | 1896921 A | 1/2007 |

(Continued)

OTHER PUBLICATIONS

Chinese Office Action, Chinese Patent Application No. 200980118088.4, Date: Sep. 24, 2012, pp. 1-5.
(Continued)

*Primary Examiner* — Steven Sax
(74) *Attorney, Agent, or Firm* — Paradice and Li LLP

(57) ABSTRACT

A computing device runs multiple activities concurrently and provides at least two modes for interacting with the activities. The user may toggle between the modes as desired. In a full-screen mode, one activity occupies substantially an entire display screen. In a windowed mode, the activity is visible within a window, and a portion of at least one other window is also visible. In the windowed mode, the user can cause windows to move, thereby changing focus from one activity to another. For example, the window having focus can be moved off the screen, to be replaced by a new window that is then given focus. The windows are ordered in a sequence and move in concert with one another; pushing one window off one edge of the screen causes a new window to appear at the opposite edge. A persistent positional relationship can be established among windows.

38 Claims, 14 Drawing Sheets

(51) Int. Cl.
*H04L 12/24* (2006.01)
*G06F 3/0483* (2013.01)
*G06F 3/0485* (2013.01)
*G06F 9/44* (2006.01)

(56) References Cited

U.S. PATENT DOCUMENTS

| | | | |
|---|---|---|---|
| 5,499,330 | A | 3/1996 | Lucas et al. |
| 5,574,846 | A | 11/1996 | Yoshimura et al. |
| 5,586,244 | A | 12/1996 | Berry et al. |
| 5,675,361 | A | 10/1997 | Santilli |
| 5,677,708 | A | 10/1997 | Matthews, III et al. |
| 6,011,537 | A | 1/2000 | Slotznick |
| 6,061,050 | A | 5/2000 | Allport et al. |
| 6,323,846 | B1 | 11/2001 | Westerman et al. |
| 6,407,757 | B1 | 6/2002 | Ho |
| 6,441,811 | B1 | 8/2002 | Sawada et al. |
| 6,570,557 | B1 | 5/2003 | Westerman et al. |
| 6,590,593 | B1 | 7/2003 | Robertson et al. |
| 6,600,936 | B1 | 7/2003 | Kaerkkaeinen et al. |
| 6,613,100 | B2 | 9/2003 | Miller |
| 6,677,932 | B1 | 1/2004 | Westerman |
| 6,680,677 | B1 | 1/2004 | Tiphane |
| 6,686,906 | B2 | 2/2004 | Salminen et al. |
| 6,765,559 | B2 | 7/2004 | Hayakawa |
| 6,924,789 | B2 | 8/2005 | Bick |
| 6,958,749 | B1 | 10/2005 | Matsushita et al. |
| 6,992,658 | B2 | 1/2006 | Wu et al. |
| 7,030,861 | B1 | 4/2006 | Westerman et al. |
| 7,051,291 | B2 | 5/2006 | Sciammarella et al. |
| 7,151,528 | B2 | 12/2006 | Taylor et al. |
| 7,159,176 | B2 | 1/2007 | Billmaier et al. |
| 7,170,500 | B2 | 1/2007 | Canova, Jr. |
| 7,352,363 | B2 | 4/2008 | Coates et al. |
| 7,360,166 | B1 | 4/2008 | Krzanowski |
| 7,394,452 | B2 | 7/2008 | Wong et al. |
| 7,434,177 | B1 | 10/2008 | Ording et al. |
| 7,479,949 | B2 | 1/2009 | Jobs et al. |
| 7,650,569 | B1 | 1/2010 | Allen et al. |
| 7,663,607 | B2 | 2/2010 | Hotelling et al. |
| 7,705,830 | B2 * | 4/2010 | Westerman ......... G06F 3/04883 345/173 |
| D615,989 | S | 5/2010 | Chaudhri |
| 7,770,136 | B2 * | 8/2010 | Beeck ................ G06F 3/017 715/863 |
| 7,800,592 | B2 | 9/2010 | Kerr et al. |
| 7,934,168 | B2 | 4/2011 | Sakamoto et al. |
| 8,001,479 | B2 | 8/2011 | Katsuranis et al. |
| 8,001,488 | B1 | 8/2011 | Lam |
| 8,159,469 | B2 | 4/2012 | Shiplacoff et al. |
| 8,296,684 | B2 | 10/2012 | Duarte et al. |
| 8,373,673 | B2 | 2/2013 | Shiplacoff et al. |
| 8,423,076 | B2 * | 4/2013 | Kim ................... G06F 3/0346 345/156 |
| 8,448,083 | B1 * | 5/2013 | Migos et al. ............ 715/781 |
| 8,683,362 | B2 | 3/2014 | Shiplacoff et al. |
| 2002/0089536 | A1 | 7/2002 | Dang |
| 2002/0109735 | A1 | 8/2002 | Chang et al. |
| 2002/0191013 | A1 | 12/2002 | Abrams |
| 2003/0085870 | A1 * | 5/2003 | Hinckley ............. G06F 1/1626 345/156 |
| 2003/0148799 | A1 | 8/2003 | Chen |
| 2003/0222917 | A1 * | 12/2003 | Trantow ............... G06F 1/1626 715/778 |
| 2004/0100479 | A1 | 5/2004 | Nakano et al. |
| 2004/0189720 | A1 | 9/2004 | Wilson et al. |
| 2004/0193413 | A1 * | 9/2004 | Wilson et al. .............. 704/243 |
| 2005/0003851 | A1 | 1/2005 | Chrysochoos et al. |
| 2005/0021336 | A1 | 1/2005 | Katsuranis |
| 2005/0024322 | A1 | 2/2005 | Kupka |
| 2005/0057524 | A1 | 3/2005 | Hill et al. |
| 2005/0071761 | A1 | 3/2005 | Kontio |
| 2005/0078093 | A1 | 4/2005 | Peterson et al. |
| 2005/0088416 | A1 | 4/2005 | Hollingsworth |
| 2005/0102638 | A1 | 5/2005 | Jiang et al. |
| 2005/0131945 | A1 * | 6/2005 | Muller et al. .............. 707/104.1 |
| 2005/0149879 | A1 | 7/2005 | Jobs et al. |
| 2005/0188329 | A1 * | 8/2005 | Cutler et al. .................. 715/804 |
| 2005/0190280 | A1 | 9/2005 | Haas et al. |
| 2005/0192924 | A1 | 9/2005 | Drucker et al. |
| 2005/0243053 | A1 | 11/2005 | Liess et al. |
| 2006/0007181 | A1 | 1/2006 | Jung et al. |
| 2006/0010395 | A1 | 1/2006 | Aaltonen |
| 2006/0015878 | A1 | 1/2006 | Ritter |
| 2006/0053387 | A1 | 3/2006 | Ording |
| 2006/0075348 | A1 | 4/2006 | Xu et al. |
| 2006/0085757 | A1 | 4/2006 | Andre et al. |
| 2006/0125962 | A1 | 6/2006 | Shelton et al. |
| 2006/0181548 | A1 | 8/2006 | Hafey et al. |
| 2006/0197753 | A1 | 9/2006 | Hotelling |
| 2006/0218504 | A1 | 9/2006 | Hiroi et al. |
| 2006/0224989 | A1 | 10/2006 | Pettiross et al. |
| 2006/0267951 | A1 | 11/2006 | Rainisto |
| 2007/0101292 | A1 | 5/2007 | Kupka |
| 2007/0101297 | A1 | 5/2007 | Forstall et al. |
| 2007/0152978 | A1 | 7/2007 | Kocienda et al. |
| 2007/0152984 | A1 | 7/2007 | Ording et al. |
| 2007/0165004 | A1 | 7/2007 | Seelhammer et al. |
| 2007/0177803 | A1 | 8/2007 | Elias et al. |
| 2007/0220440 | A1 | 9/2007 | Song et al. |
| 2007/0226647 | A1 | 9/2007 | Louch |
| 2007/0245263 | A1 | 10/2007 | Hale et al. |
| 2007/0247431 | A1 | 10/2007 | Skillman et al. |
| 2007/0273668 | A1 | 11/2007 | Park et al. |
| 2007/0277124 | A1 | 11/2007 | Shin et al. |
| 2007/0288860 | A1 | 12/2007 | Ording et al. |
| 2007/0296709 | A1 | 12/2007 | GuangHai |
| 2008/0001924 | A1 | 1/2008 | De Los Reyes et al. |
| 2008/0034317 | A1 * | 2/2008 | Fard et al. .................... 715/781 |
| 2008/0055265 | A1 | 3/2008 | Bewley et al. |
| 2008/0062139 | A1 | 3/2008 | Hotelling et al. |
| 2008/0062140 | A1 | 3/2008 | Hotelling et al. |
| 2008/0062147 | A1 | 3/2008 | Hotelling et al. |
| 2008/0062148 | A1 | 3/2008 | Hotelling et al. |
| 2008/0064499 | A1 | 3/2008 | Grant et al. |
| 2008/0082930 | A1 | 4/2008 | Omernick et al. |
| 2008/0084400 | A1 | 4/2008 | Rosenberg |
| 2008/0084440 | A1 | 4/2008 | Omata et al. |
| 2008/0089587 | A1 * | 4/2008 | Kim et al. ..................... 382/190 |
| 2008/0100593 | A1 | 5/2008 | Skillman et al. |
| 2008/0104544 | A1 | 5/2008 | Collins et al. |
| 2008/0148149 | A1 * | 6/2008 | Singh et al. .................. 715/700 |
| 2008/0168401 | A1 | 7/2008 | Boule et al. |
| 2008/0168403 | A1 | 7/2008 | Westerman et al. |
| 2008/0168405 | A1 * | 7/2008 | Tolmasky et al. ............ 715/863 |
| 2008/0174570 | A1 * | 7/2008 | Jobs et al. ..................... 345/173 |
| 2008/0177994 | A1 * | 7/2008 | Mayer .............................. 713/2 |
| 2008/0204402 | A1 | 8/2008 | Hirata et al. |
| 2008/0256472 | A1 | 10/2008 | Kim et al. |
| 2008/0281689 | A1 | 11/2008 | Blinnikka et al. |
| 2008/0297484 | A1 | 12/2008 | Park et al. |
| 2008/0303794 | A1 | 12/2008 | Bolt et al. |
| 2008/0307335 | A1 | 12/2008 | Chaudhri et al. |
| 2008/0316183 | A1 | 12/2008 | Westerman et al. |
| 2009/0013282 | A1 * | 1/2009 | Mercer ....................... 715/788 |
| 2009/0019031 | A1 | 1/2009 | Krovitz et al. |
| 2009/0070691 | A1 | 3/2009 | Jain |
| 2009/0085886 | A1 | 4/2009 | Huang et al. |
| 2009/0164928 | A1 | 6/2009 | Brown et al. |
| 2009/0183120 | A1 | 7/2009 | Ording et al. |
| 2009/0193364 | A1 | 7/2009 | Jarrett et al. |
| 2009/0199241 | A1 | 8/2009 | Unger et al. |
| 2009/0278806 | A1 | 11/2009 | Duarte et al. |
| 2010/0081475 | A1 | 4/2010 | Chiang et al. |
| 2010/0122290 | A1 | 5/2010 | Allen et al. |
| 2010/0156656 | A1 | 6/2010 | Duarte et al. |
| 2010/0156813 | A1 | 6/2010 | Duarte et al. |
| 2010/0169766 | A1 | 7/2010 | Duarte et al. |
| 2010/0211872 | A1 | 8/2010 | Rolston et al. |
| 2010/0214278 | A1 | 8/2010 | Miura |
| 2010/0295801 | A1 | 11/2010 | Bestle et al. |
| 2011/0093494 | A1 | 4/2011 | Chandler et al. |
| 2012/0278756 | A1 | 11/2012 | Shah et al. |
| 2013/0298057 | A1 | 11/2013 | Duarte et al. |

(56) References Cited

U.S. PATENT DOCUMENTS

| | | | |
|---|---|---|---|
| 2014/0157191 A1 | 6/2014 | Shiplacoff et al. | |
| 2014/0258897 A1 | 9/2014 | Shiplacoff et al. | |
| 2015/0169528 A1* | 6/2015 | Sjogreen | G06Q 10/1095 715/227 |

FOREIGN PATENT DOCUMENTS

| | | |
|---|---|---|
| CN | 101167045 A | 4/2008 |
| CN | 101390039 A | 3/2009 |
| EP | 0 548 646 A1 | 6/1993 |
| EP | 1462921 A2 | 9/2004 |
| EP | 1688830 A1 | 8/2006 |
| EP | 1942402 A1 | 7/2008 |
| EP | 1962480 A2 | 8/2008 |
| EP | 2068236 A1 | 6/2009 |
| EP | 2076000 A2 | 7/2009 |
| GB | 2480777 A | 11/2011 |
| WO | WO-2008/030976 A2 | 3/2008 |
| WO | WO-2009080653 A1 | 7/2009 |
| WO | WO-2010096219 A2 | 8/2010 |

OTHER PUBLICATIONS

International Search Report mailed Oct. 30, 2009, issued in international application No. PCT/US2009/044389.
International Preliminary Report on Patentability issued on Nov. 30, 2010, in international application No. PCT/US2009/044389.
International Search Report mailed Oct. 30, 2009, issued in international application No. PCT/US2009/044390.
International Preliminary Report on Patentability issued on Nov. 23, 2010, in international application No. PCT/US2009/044390.
Office Action mailed Jan. 18, 2012, issued in related U.S. Appl. No. 12/126,145, filed May 23, 2008.
Examination Report, Application No. GB1021630.7, Date Issued: Jan. 24, 2012, pp. 1-5.
Extended European Search Report, European Application No. 09751303.0, Date: Apr. 2, 2012, pp. 1-6.
Extended European Search Report, European Application No. 09751304.8, Date: Apr. 3, 2012, pp. 1-6.
GB Examination Report, Application No. GB1021636.4, Date: Mar. 20, 2012, pp. 1-3.
"Designing for the Multitasker," Internet Article, Publication Date: Mar. 17, 2010; <http://blog.graphicpeel.com/post/454779602/designing-for-the-multitasker>.
Moyle, Michael et al., The Design and Evaluation of Flick Gesture for 'Back' and 'Forward' in Web Browsers, Proceedings of the Fourth Australian user interface conference on User interfaces 2003, vol. 18, Australian Computer Society, Inc. Darlinghurst, Australia, copyright 2003, ISBN:0-909925-96-8. 8 pages.
iPhone User's Guide, Chapter 5, pp. 58-59, Apple Safari Browser, "Opening Multiple Webpages at Once," (2007).
Non-Final Office Action issued on Oct. 3, 2011, in related U.S. Appl. No. 12/416,279, filed Apr. 1, 2009.

* cited by examiner

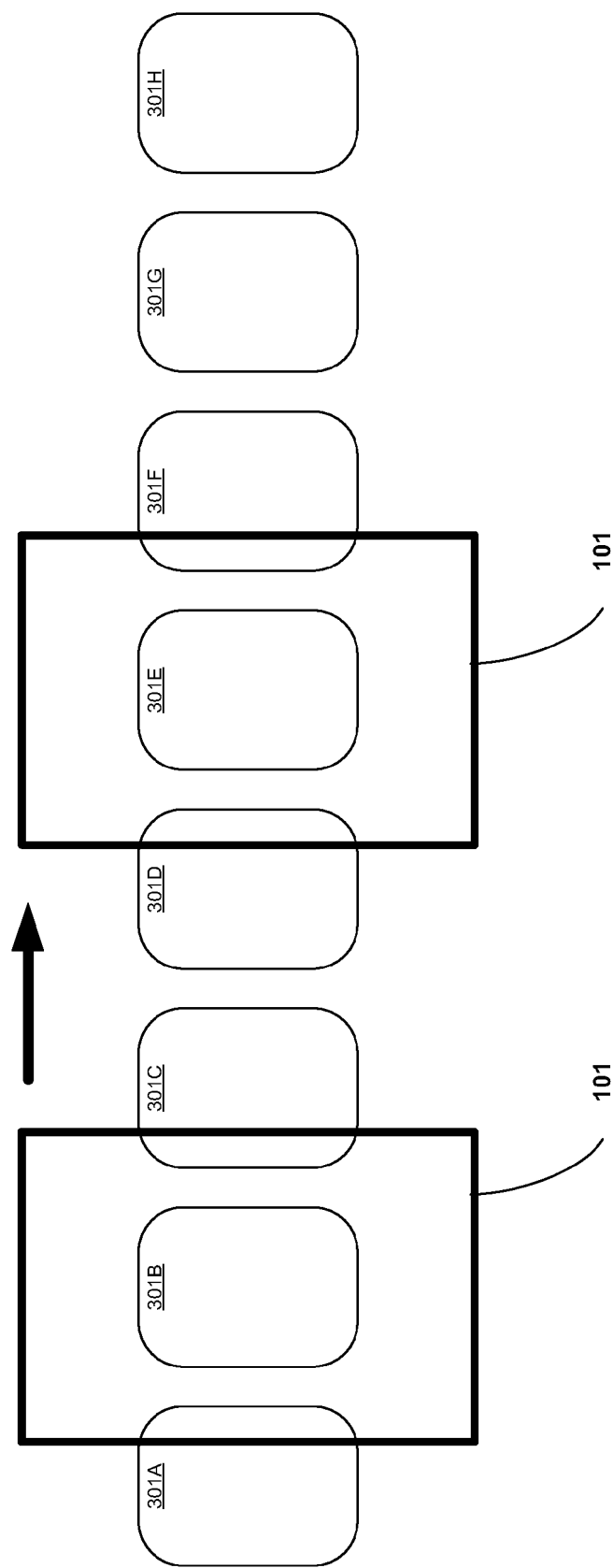

NAVIGATING AMONG ACTIVITIES IN A COMPUTING DEVICE

CROSS-REFERENCE TO RELATED APPLICATIONS

The present application is a Divisional of U.S. patent application Ser. No. 12/126,145, filed May 23, 2008, for "Navigating Among Activities in a Computing Device," the disclosure of which is incorporated herein by reference in its entirety.

The present application is related to U.S. patent application Ser. No. 12/115,992, filed May 6, 2008, for "Extended Touch-Sensitive Control Area for Electronic Device," the disclosure of which is incorporated herein in its entirety.

The present application is related to U.S. patent application Ser. No. 11/379,552, filed Apr. 20, 2006, for "Keypad and Sensor Combination to Provide Detection Region that Overlays Keys," the disclosure of which is incorporated herein in its entirety.

FIELD OF THE INVENTION

The present invention relates to application management in computing devices, and more particularly to systems and methods for navigating among activities such as applications in such devices.

DESCRIPTION OF THE RELATED ART

Many currently available computing devices run operating systems that offer users the opportunity to run several applications at the same time, and even to perform several activities simultaneously, within a single application and/or among two or more applications. For example, a user may open an e-mail application, a word processing application, an on-screen calculator, and a web browser, so that all of the applications are open concurrently. The user may open several documents within the word processing application, and may open several e-mail messages. Such an arrangement allows the user to easily move from one task to another by keeping these various applications and activities open at the same time.

Conventionally, such an operating paradigm is accomplished by the use of multiple overlapping windows within a graphical user interface. A desktop metaphor is often employed, wherein the user can move and resize windows on a display screen by direct manipulation. Thus, each application may have a window or several windows; at any given time, one window has focus (usually indicated as such by being situated on top of the other windows). Other windows may be visible, invisible, or partially visible (for example if they are partially or completely obscured by other windows). A user can switch from one task to another by causing a different window to have focus; this is commonly accomplished by clicking on a visible portion of the window being activated, or by clicking on a button or icon representing the window or application in a task bar, dock, or similar construct. In some operating systems, pop-up menus and/or keyboard shortcuts may be available for switching among applications or documents.

Overlapping windows are a highly effective mechanism for application management. They exploit the user's spatial memory by associating a particular area of the screen with a particular task being performed. A user may find it easier to return to a previously opened window when he or she remembers that the window was placed at a particular location on the screen, as compared with a list or menu of open windows that does not provide a model of spatial placement and stability.

One issue with conventional window-based mechanisms for application management is that a large screen size is usually needed. Users faced with limited screen space must choose between, on the one hand, making windows smaller and thus reducing available workspace within each application, and, on the other hand, stacking windows atop each other so that only one window (or very few) is visible at a time. Reducing workspace can make it very difficult to use an application, particularly for applications such as word processing, photo editing, drawing, and the like. Stacking windows reduces the ease with which the user can switch from one application or document to another, as it is more difficult to see what is currently open and to find the appropriate window to be activated. When windows are stacked, users usually resort to navigation via taskbar, dock, menu, keyboard shortcut, or the like, thereby reducing the advantages of the overlapping window paradigm.

Some systems, such as the Mac OS operating system offered by Apple, Inc. of Cupertino, Calif., offer a mechanism for navigating among open applications by temporarily moving and shrinking open windows, moving the windows apart from one another so that they do not overlap. The user can then activate one of the windows; the original window positions and sizes are then restored, with the activated window on top. This feature is effective in allowing users to quickly switch among open applications and documents, but still requires a relatively large amount of screen space so as to effectively show the temporarily shrunk windows when the user is to select among them.

Mobile devices such as smartphones, personal digital assistants, music players, handheld computers, and the like are becoming increasingly powerful. Many are now able to run several applications concurrently, and to perform sophisticated functions that rival traditional computing devices. However, most such devices have extremely small screens, when compared to laptop or desktop computers. Thus, the conventional window-based techniques for navigating among open applications and documents do not function very well on mobile devices. There is insufficient screen space to display multiple overlapping windows. In fact, many such devices do not even have enough space to display a task bar or dock. Rather, the entire screen is often devoted to a single application, document, message, task, or activity, so as to make the most effective use of the extremely limited amount of space available.

What is needed is a system and method for application management that provides the advantages of multiple overlapping windows but is effective for a device having a small screen. What is further needed is a system and method that allows users to switch easily among activities, including applications, documents, and tasks, in a device having limited screen space. What is further needed is a system and method that is scalable to different screen sizes, and that provides solutions for all application and activity management, including starting activities, ending activities, and switching from one activity to another.

SUMMARY OF THE INVENTION

According to the present invention, a computing device runs two or more activities concurrently and provides at least two modes for interacting with the activities. The user may toggle between the modes as desired. A button or other control is provided for switching between full-screen mode and windowed mode.

In a full-screen mode, one activity occupies substantially an entire display screen.

In a windowed mode, the activity is visible within a window, and a portion of at least one other window is also visible. Thus, the window that has focus is visible in full, while at least one other window is only partially visible. The window occupied by the activity is referred to as having focus. In the windowed mode, the user can cause windows to move on the screen, so as to change focus from one activity to another. For example, the window having focus can be moved off the screen, to be replaced by a new window that is then given focus. In one aspect, the activities are ordered in a sequence and the windows appear in a corresponding sequence. In one aspect, the windows move in concert with one another; pushing one window off one edge of the screen causes a new window to appear at the opposite edge. A persistent positional relationship can be established among windows.

In response to a user command, the windows shift position on the screen, so that the window that currently has focus becomes only partially visible and one of the other windows becomes fully visible and has focus. The windows move in concert with each other, in response to user commands. Thus, for example, if the user indicates that the central window should move in a rightward direction, then the entire display shifts to the right, as follows:

The central window (which has focus) moves to the right, so that it is only partially visible along the right hand side of the display.

If any window was partially visible to the right of the window that has focus, it moves off the right edge of the screen so that it is no longer visible.

If any window was partially visible to the left of the window that has focus, it moves to the right so that it is now fully visible and has focus.

The user indicates such movement, for example, by direct manipulation of the displayed windows. This can be performed on a touch screen, for example, by dragging the central window to the left or to the right on the screen or by tapping on a window that is partially displayed. Alternatively, a trackball, touch-sensitive pad, or other input device can be provided for facilitating such direct manipulation.

In one embodiment, the window that currently has focus is always fully visible and displayed in a substantially central location on the screen with respect to partially displayed windows.

Window motion can be constrained to a single axis, for example horizontal or vertical but not both, so as to simplify the positional relationship among windows. Alternatively, two or more axes of movements can be made available.

Once the user has moved the desired window to the central position so that it has focus, he or she can indicate that the display should return to full-screen mode, so that the activity having focus occupies substantially the entire screen. Alternatively, the device can return to full-screen mode automatically after a period of time elapses where no window movement takes place, or if the user starts to interact with the activity that has focus.

Thus, the full-screen display mode may be used for interacting with the activity, and the windowed mode may be used for switching from one activity to another. However, in one aspect the invention allows full interaction with the activity in windowed mode as well.

A persistent positional relationship can be established among windows. The positional relationship can be a one-dimensional sequence or some more complex two-dimensional relationship. The positional relationship is persistent in the sense that it does not change unless the user indicates that it should be changed, or some other event takes place that indicates a change is warranted (such as non-use of an application, or an application crashing or being dismissed).

Additional features and advantages will become apparent in the description provided below.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

FIG. 7 is a conceptual depiction of a sequence switching from one activity to another according to one embodiment of the present invention.

DETAILED DESCRIPTION OF THE EMBODIMENTS

In the following description, reference is made herein to "activities". In the context of the present invention, an "activity" is intended to include a software application, a task, a document, a page, and/or any other activity that can be performed in connection with an electronic device. As described herein, the present invention provides techniques for starting and ending activities, and for switching among activities.

System Architecture

The present invention can be implemented on any electronic device, such as a handheld computer, personal digital assistant (PDA), personal computer, kiosk, cellular telephone, and the like. For example, the invention can be implemented as a feature of an application management paradigm for a software application or operating system running on such a device. Accordingly, the present invention can be implemented as part of a graphical user interface for controlling software on such a device.

The invention is particularly well-suited to devices such as smartphones, handheld computers, and PDAs, which have limited screen space and which are capable of running several software applications concurrently. One skilled in the art will recognize, however, that the invention can be practiced in many other contexts, including any environment in which it is useful to switch easily and smoothly from one activity to another. Accordingly, the following description is intended to illustrate the invention by way of example, rather than to limit the scope of the claimed invention.

Figure 1:
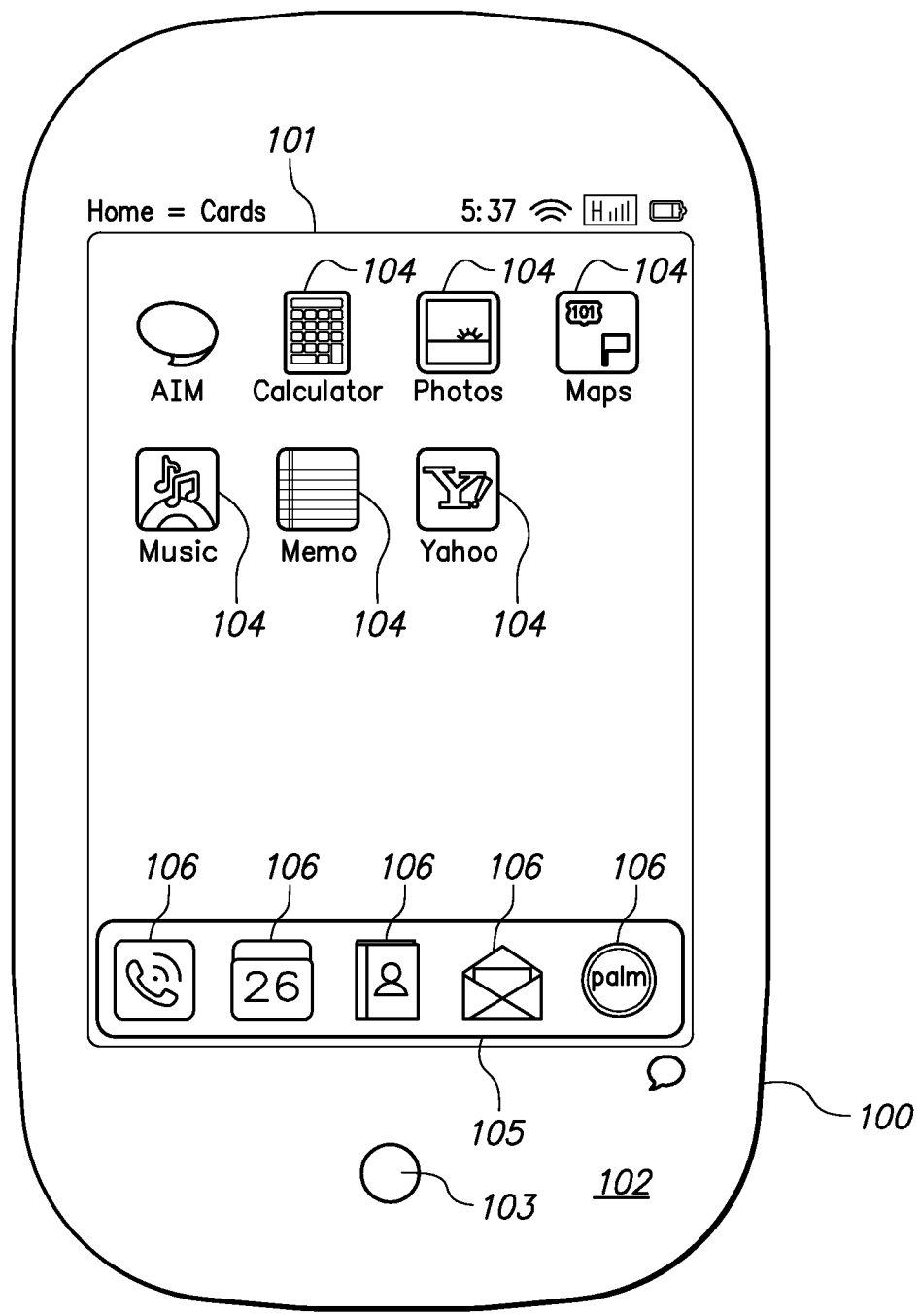
FIG. 1 depicts a display screen showing a launcher for initiating an activity such as an application.

Referring now to FIG. 1, there is shown an example of an example of a device 100 including a display screen 101 showing a launcher including several icons 104 representing applications that can be opened by the user. A dock 105 is also shown, including additional icons 106 for launching commonly used applications and other functions. Dock 105 is not necessary for the present invention, but is shown for illustrative purposes only.

In one embodiment, screen 101 is touch-sensitive, so that a user can activate an application or function by touching a displayed icon 104, 106. In one embodiment, device 100 also includes a touch-sensitive gesture area 102 for entering gesture-based commands, as described in the above-referenced related application. In another embodiment, screen 101 and/or gesture area 102 is sensitive to user motion in proximity to the surface, so as to detect gestures and commands performed near the surface but without necessarily contacting the surface.

For illustrative purposes, device 100 as shown in FIG. 1 is a personal digital assistant or smartphone. Such devices commonly have telephone, email, and text messaging capability, and may perform other functions including, for example, playing music and/or video, surfing the web, running productivity applications, and the like. The present invention can be implemented in any type of device having a touch-sensitive screen, and is not limited to devices having the listed functionality. In addition, the particular layout shown in FIG. 1 is merely exemplary and is not intended to be restrictive of the scope of the claimed invention.

Touch-sensitive screen 101 and gesture area 102 can be implemented using any technology that is capable of detecting a location of contact and/or user motion proximate to the surface. Alternatively, the present invention can be implemented with other user input mechanisms, such as a keyboard, trackball, stylus, or the like. One skilled in the art will recognize that the techniques of the present invention are well suited to direct manipulation, but that any input technique can be used. In one embodiment, gesture area 102 provides a touch-sensitive control area extending beyond the edges of touch-sensitive screen 101, as described in related application Ser. No. 12/115,992, filed May 6, 2008, for "Extended Touch-Sensitive Control Area for Electronic Device," the disclosure of which is incorporated herein.

Device 101 as shown in FIG. 1 also has a physical button 103. In one embodiment, physical button 103 can be used to toggle between full-screen mode and windowed mode, as described in more detail below. Physical button 103 is not needed for the present invention, and is shown for illustrative purposes only.

As described herein, at least two modes are available for interacting with device 101: a full-screen mode in which an application or other activity occupies substantially the entire display screen 101, and a windowed mode in which at least two windows are presented, at least one of which is only partially visible, with an application or other activity occupying each window. The full-screen mode is designed to devote a greater amount of screen space to the active activity, while the windowed mode provides a mechanism for navigating among activities and for rearranging, initiating, and terminating activities.

Figure 2:
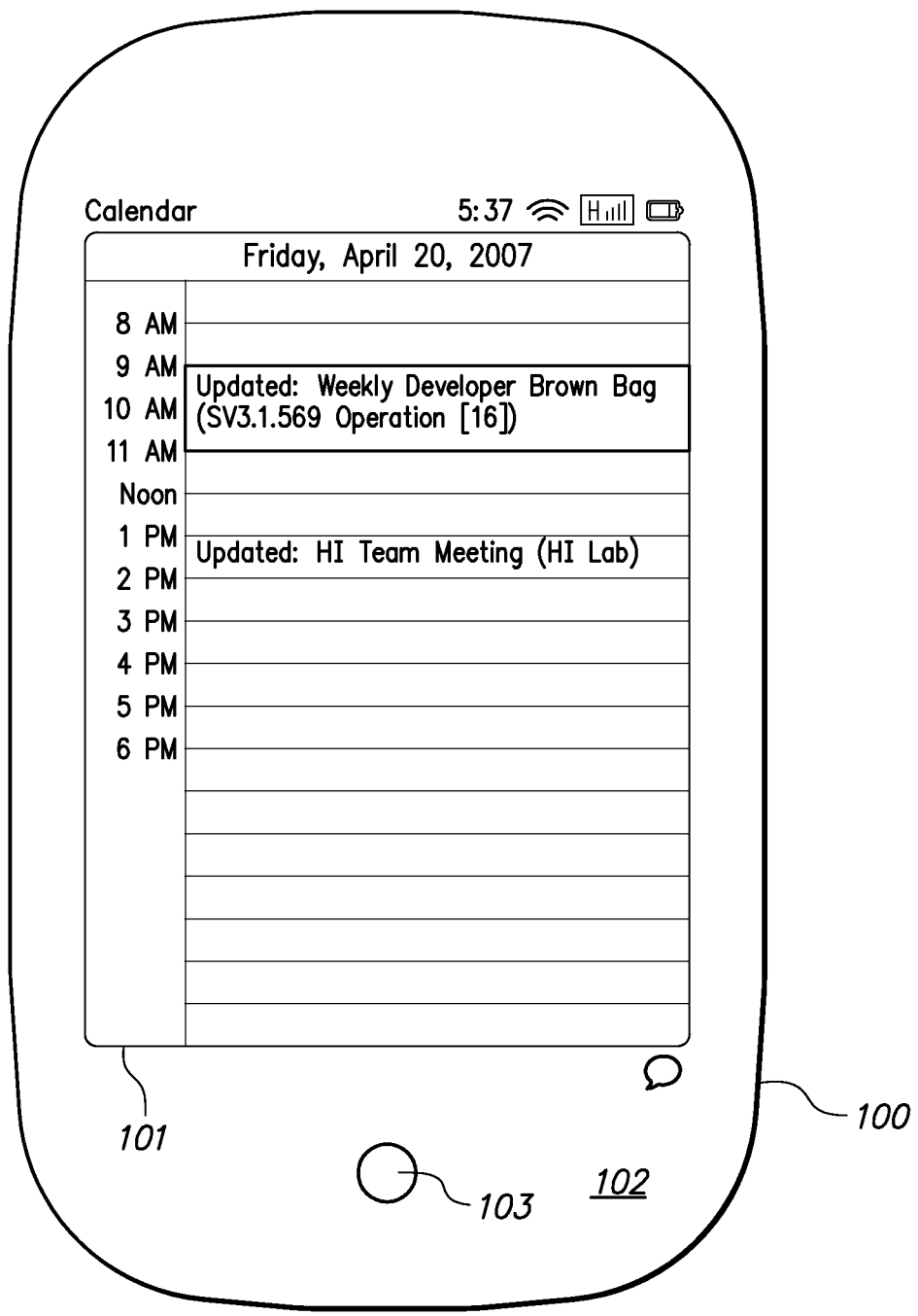
FIG. 2 depicts a display screen in full-screen mode, wherein an activity occupies substantially the entire display screen, according to one embodiment of the present invention.

Referring now to FIG. 2, there is shown display screen 101 in full-screen mode. In the example, a calendar application occupies substantially the entire display screen 101; however, one skilled in the art will recognize that any activity can be presented in this manner. As shown in FIG. 2, even in full-screen mode, certain portions of display screen 101 may be reserved for a title bar, battery indicator, clock, signal strength indicator, and the like. Accordingly, the term "full-screen mode" as used herein is intended to refer to any arrangement wherein the primary focus of the screen 101 is a single activity, even if other, smaller areas of screen 101 are reserved for other functions.

The user interacts with the active activity (such as the calendar application shown in FIG. 2) by conventional user interface methods, including manipulating on-screen elements, entering text, and the like. Such techniques are well known in the art.

Figure 3:
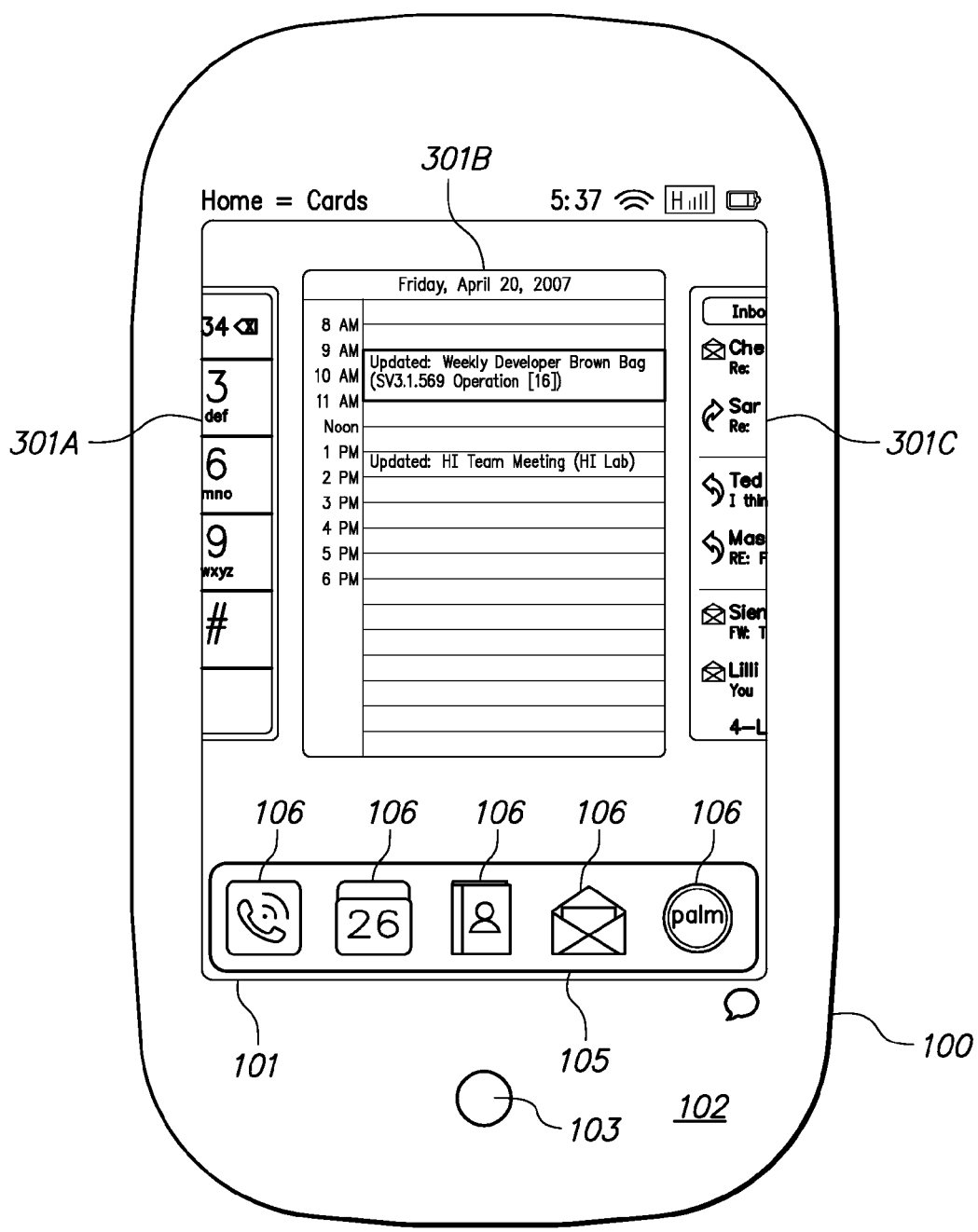
FIG. 3 depicts the display screen in windowed mode, including a window having focus and two partially displayed windows, according to one embodiment of the present invention.

Referring now to FIG. 3, there is shown an example of display screen 101 in windowed mode. In one embodiment, the user can toggle between full-screen mode and windowed mode by pressing physical button 103. In another embodiment, the user can touch or double-tap an activity 301B in windowed mode to initiate a switch to full-screen mode. In yet another embodiment, device 100 switches from windowed mode to full-screen mode after some period of inactivity. Other mechanisms can also be provided for toggling between the modes.

As can be seen in FIG. 3, in windowed mode, window 301B having focus is fully visible. Other windows 301A, 301C are only partially visible and do not have focus. Usually, window 301B having focus represents the same activity that was displayed in full-screen mode immediately before the switch to windowed mode. Any number of partially displayed windows 301A, 301C can be presented. In the example of FIG. 3, two such windows 301A, 301C are shown, one on either side of window 301B having focus. Typically, in an arrangement where windows 301 are presented along a linear axis, one or two partially displayed window(s) 301 can be displayed adjacent to the window 301 that has focus. Also, as shown in FIG. 3, in one embodiment, partially displayed windows 301A, 301C are shown slightly smaller than window 301B having focus, so as to further emphasize the fact that window 301B has focus.

Partially displayed windows 301A, 301C provide a positional context for window 301B, and provide a mechanism for navigating to other activities. In one embodiment, the user can designate a window 301A, 301C to have focus by touching any area within the window; this causes the designated window 301 to move to the central portion of display screen 101, and causes other windows to move as well, so that the same positional sequence is maintained. In one embodiment, the user can designate a window 301A, 301C to have focus by dragging any displayed window 301 to cause the desired window 301 to move to the central portion of display screen 101; again, other windows 301 move as well, so that the same positional sequence is maintained. In one embodiment, the user can move windows 301 left and right by dragging a finger along gesture area 102. In one embodiment, such a gesture can be performed even in full-screen mode, causing windows 301 to move left and right in the same manner as described above for windowed mode.

As described in more detail below, when the user drags a window 301 to the left or right within display screen 100, other windows 301 move in concert with the dragged window 301. Thus, for example, if the user drags window 301B to the right, windows 301A and 301C move to the right as well. This would cause window 301C to move off the screen, and window 301A would move to the central position of display screen 100. The same result would occur if the user drags window 301A to the right.

In one embodiment, if the user drags windows 301 so as to place a window 301 sufficiently close to the central position to make it clear that the intention is to give the window 301 focus, the window 301 snaps into the central position upon completion of the drag operation. Other windows 301 snap into place accordingly to maintain the same positional sequence. Thus, the user need not drag the window 301 all the way to the central position. If, on the other hand, the user drags windows 301 a small amount that does not cause a new window 301 to be sufficiently close to the central position, all windows 301 snap back to their previous positions upon completion of the drag operation.

In one embodiment, windows 301 show applications or other activities in operation. Thus, as the user navigates among windows 301, he or she can see the actual live application or other activity within each window 301.

Figure 4:
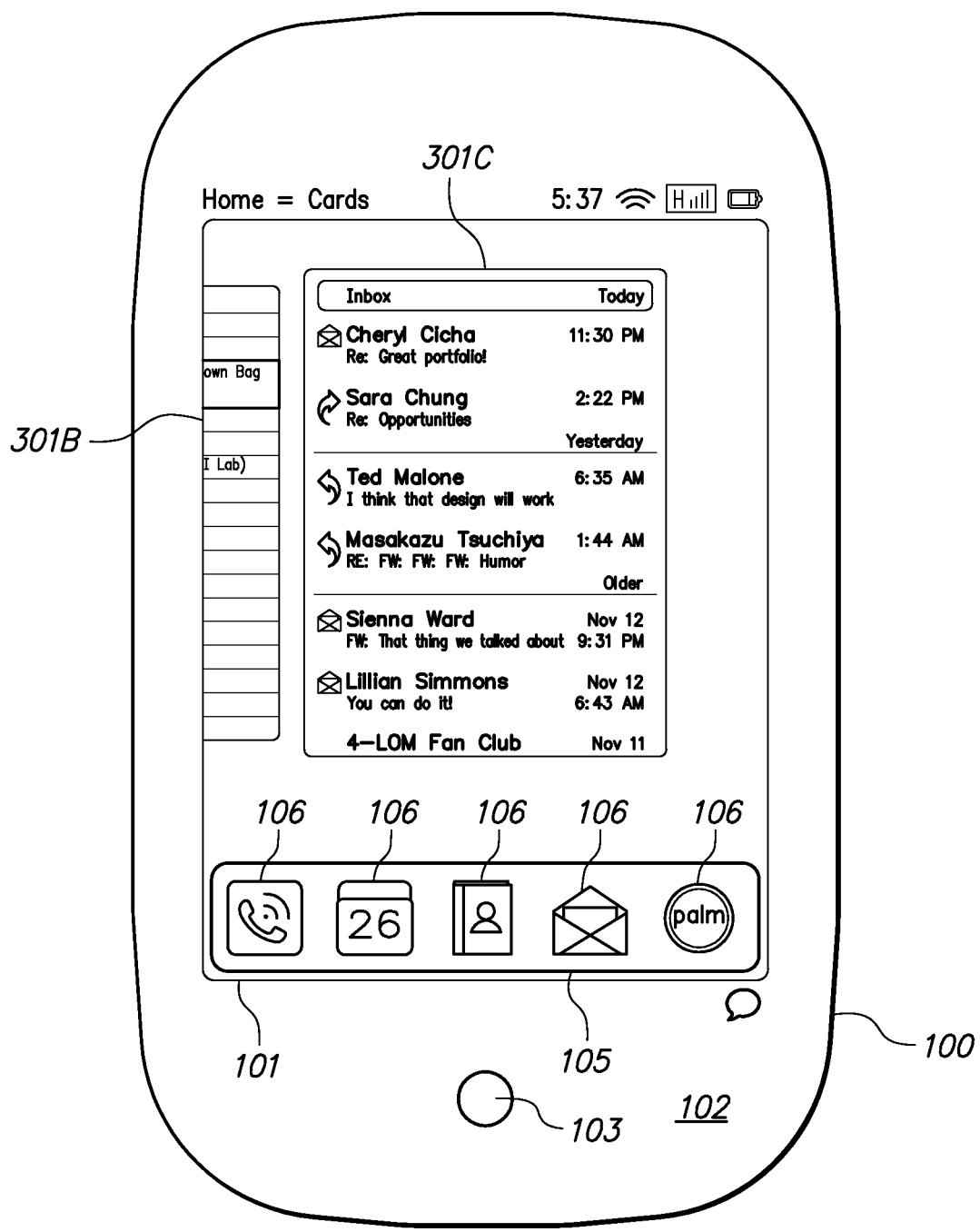
FIG. 4 depicts the display screen in windowed mode after the user has moved the windows, according to one embodiment of the present invention.

Referring now to FIG. 4, there is shown an example of display screen 101 in windowed mode, after the user has caused window 301C (representing an email application) to become centrally located and to have focus. As can be seen in FIG. 4, window 301B that previously had focus is now partially visible to the left of window 301C. Window 301A is no longer visible.

Figure 5:
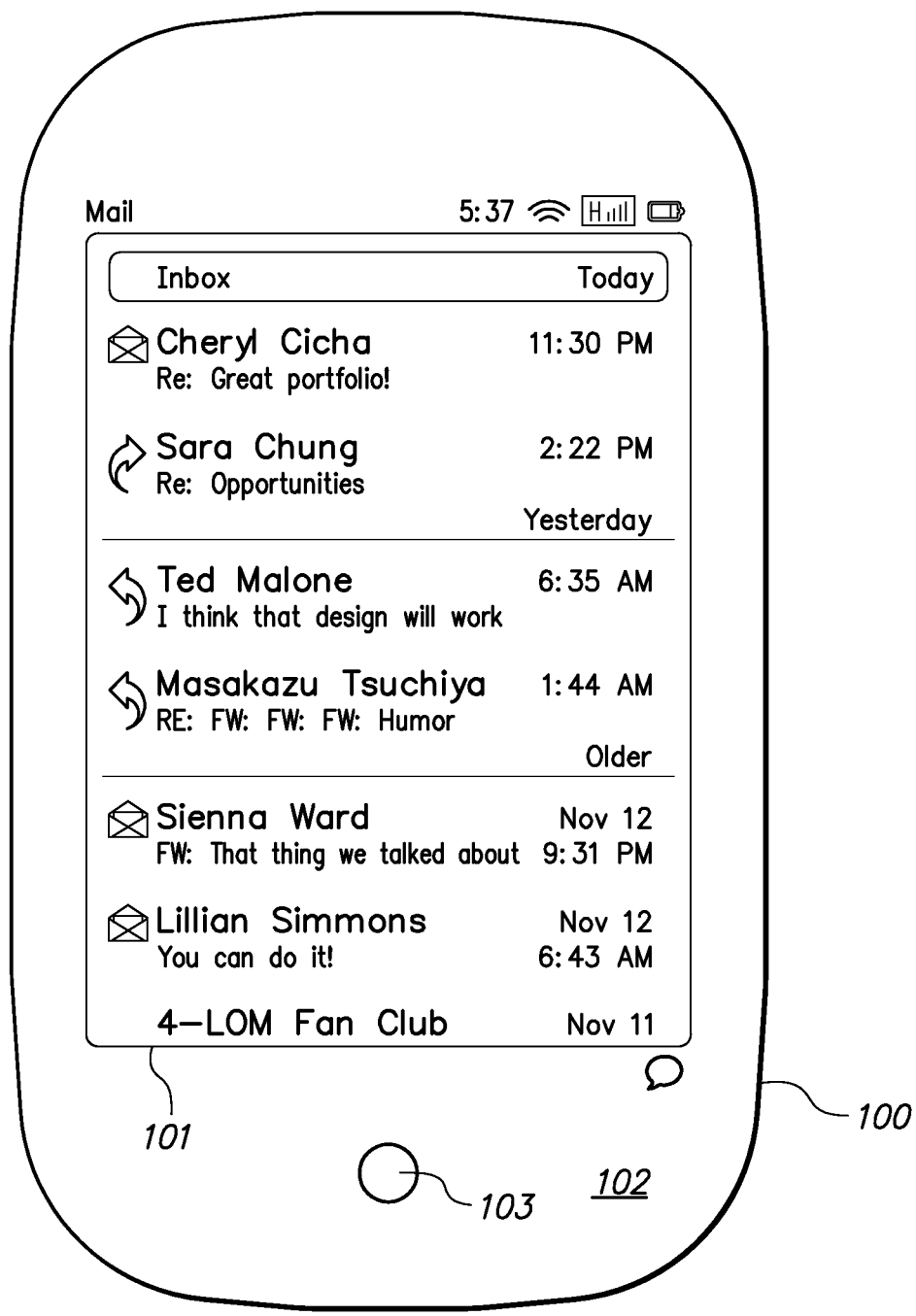
FIG. 5 depicts the display screen in full-screen mode after the user has designated a new activity as having focus, according to one embodiment of the present invention.

The user can touch or double-tap window 301C to re-enter full-screen mode with the new activity having focus and being active, as shown in FIG. 5. Alternatively, the user can press button 103 to toggle between full-screen mode and windowed mode. Thus, in FIG. 5 the user has completed the switch from the calendar application of FIG. 2 to the email application.

In the examples described herein, windows 301 are arranged in a horizontal row. The user moves windows 301 along a horizontal axis to navigate from one activity to another. One skilled in the art will recognize that other arrangements are possible. For example, windows 301 could be arranged vertically instead of horizontally. Alternatively, a two-dimensional arrangement of windows 301 can be provided.

Referring now to FIG. 7, there is shown a conceptual depiction of a sequence switching from one activity to another according to one embodiment of the present invention. A number of activities are open, each represented by a window 301A through 301H. Screen 101 only shows a subset of the windows 301 at any given time. As can be seen in the Figure, a positional sequence is maintained even though most of the windows 301 are not visible at any given time. FIG. 7 depicts movement of the display screen 101 from an initial position where window 301B has focus (and windows 301A and 301C are partially visible) to a second position where window 301E is has focus (and windows 301D and 301F are partially visible).

The movement of display screen 101 is conceptual. In actual operation, the switch from window 301B to window 301E is accomplished by moving windows 301 in a leftward direction on screen 101. For example, the user can repeatedly drag windows 301 in a leftward direction to cause windows 301C, 301D, and 301E to successively occupy the central position. Alternatively, the user can click on partially displayed window 301C to move it to the central position and to cause window 301D to be partially displayed, then on partially displayed window 301D to move it to the central position and to cause window 301E to be partially displayed, and then on partially displayed window 301E to move it to the central position. Either mechanism operates to shift focus from the activity represented by window 301B to the activity represented by window 301E.

In one embodiment, a transition effect is performed to enhance the smoothness of the transition as windows 301 move and/or snap into place. In one embodiment, the window 301 that is centrally displayed at any given time is shown slightly larger than other windows 301.

In one embodiment, more than one window 301 can be completely visible within screen 101. For example, three windows 301 might be completely visible, with additional partially-visible windows 301 on either side. The above-described techniques for moving windows 301 in concert with one another to maintain positional sequence still apply in such a variation.

In general, the sequence of windows 301 is persistent, even when the user moves from one window to another 301. In one embodiment, the sequence is circular, so that the rightmost window 301 is considered to be to the left of the leftmost window 301. Thus, moving off one end of the sequence takes the user back to the other end of the sequence.

In one embodiment, windows 301 may be moved within the sequence automatically in some circumstances. For example, frequently used windows 301 can be moved to more prominent locations in the sequence, while less frequently used windows 301 can remain in less prominent locations.

Figure 6A:
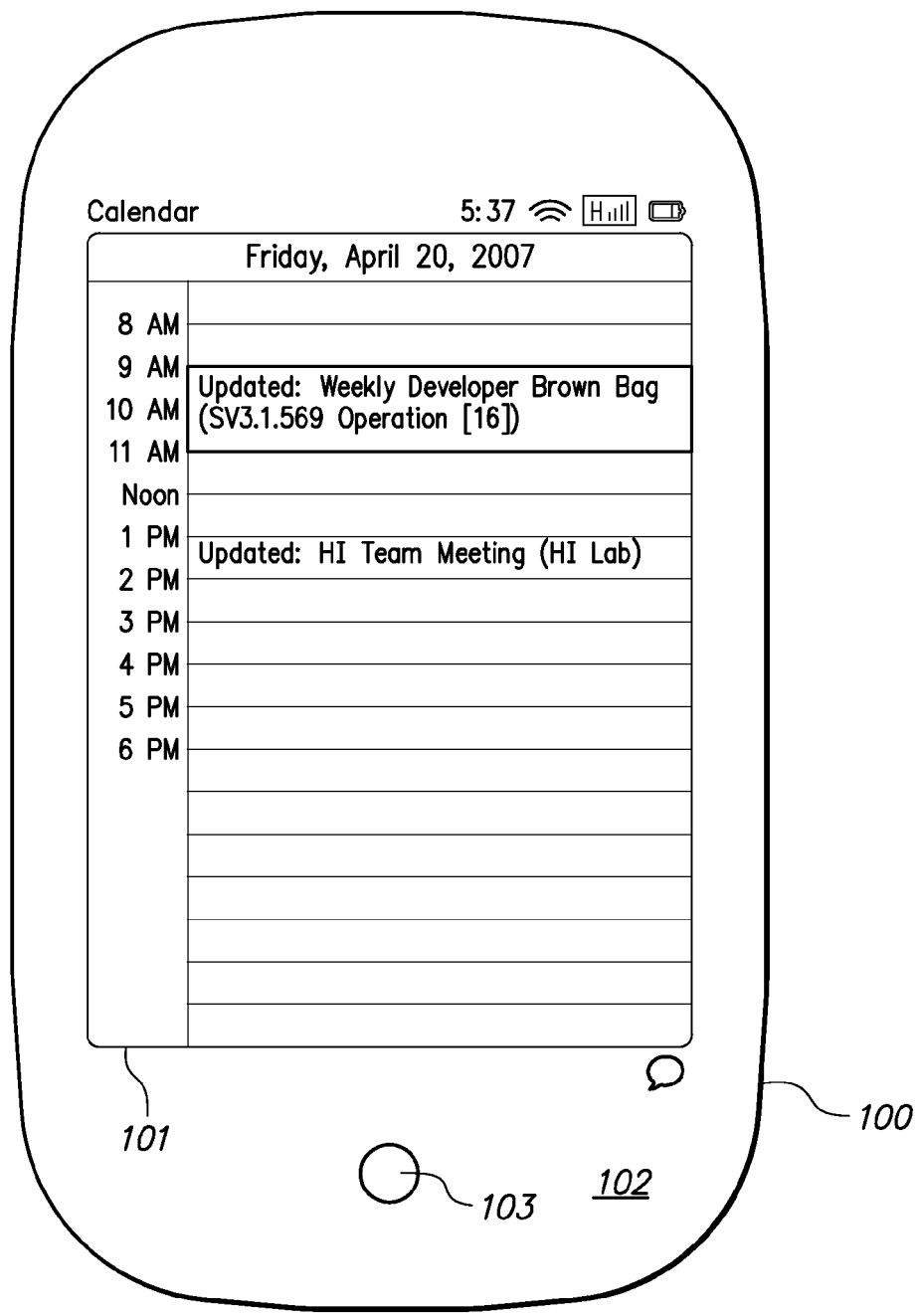
FIGS. 6A through 6F depict a sequence for switching from one activity to another according to one embodiment of the present invention.
Figure 6B:
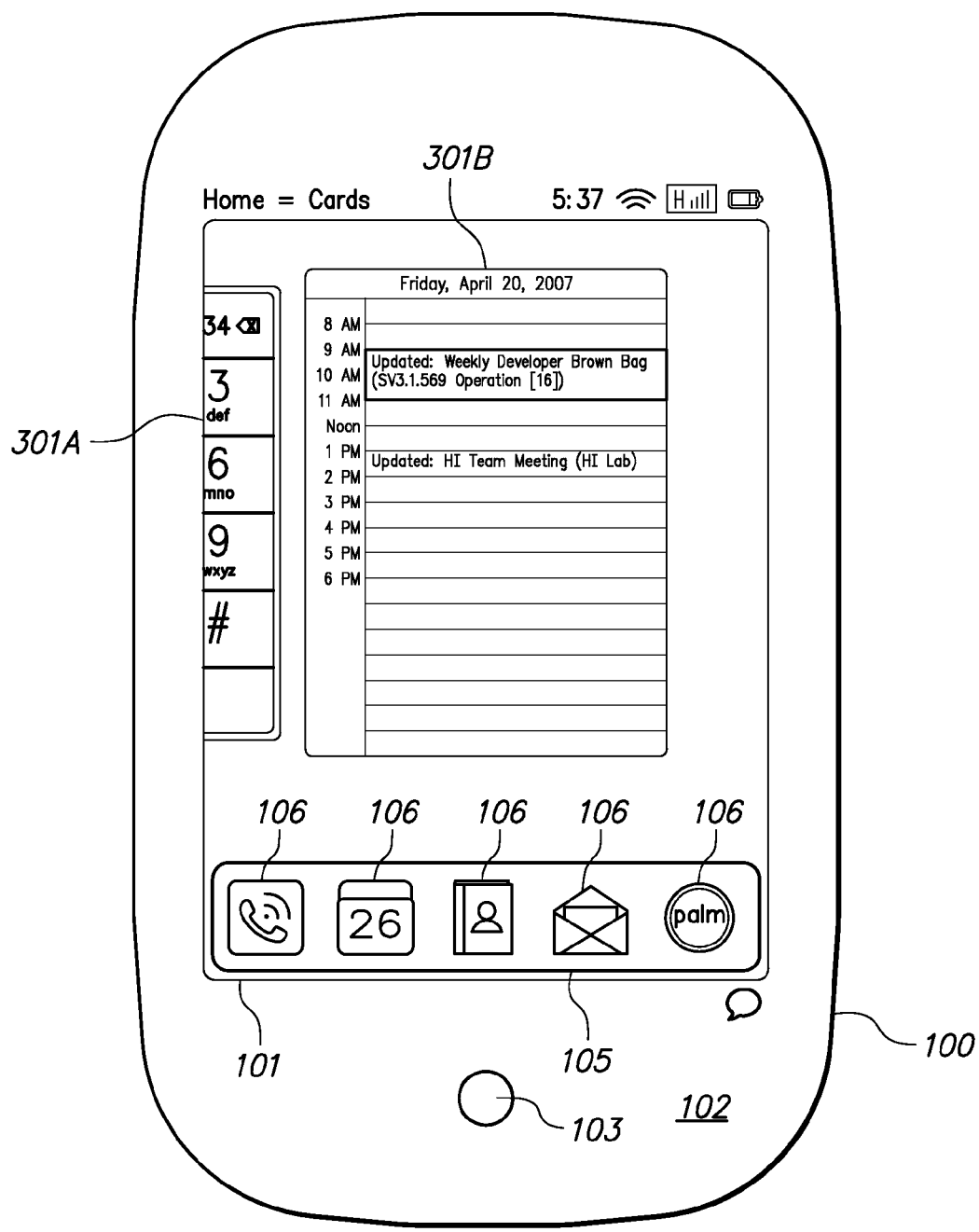
Figure 6C:
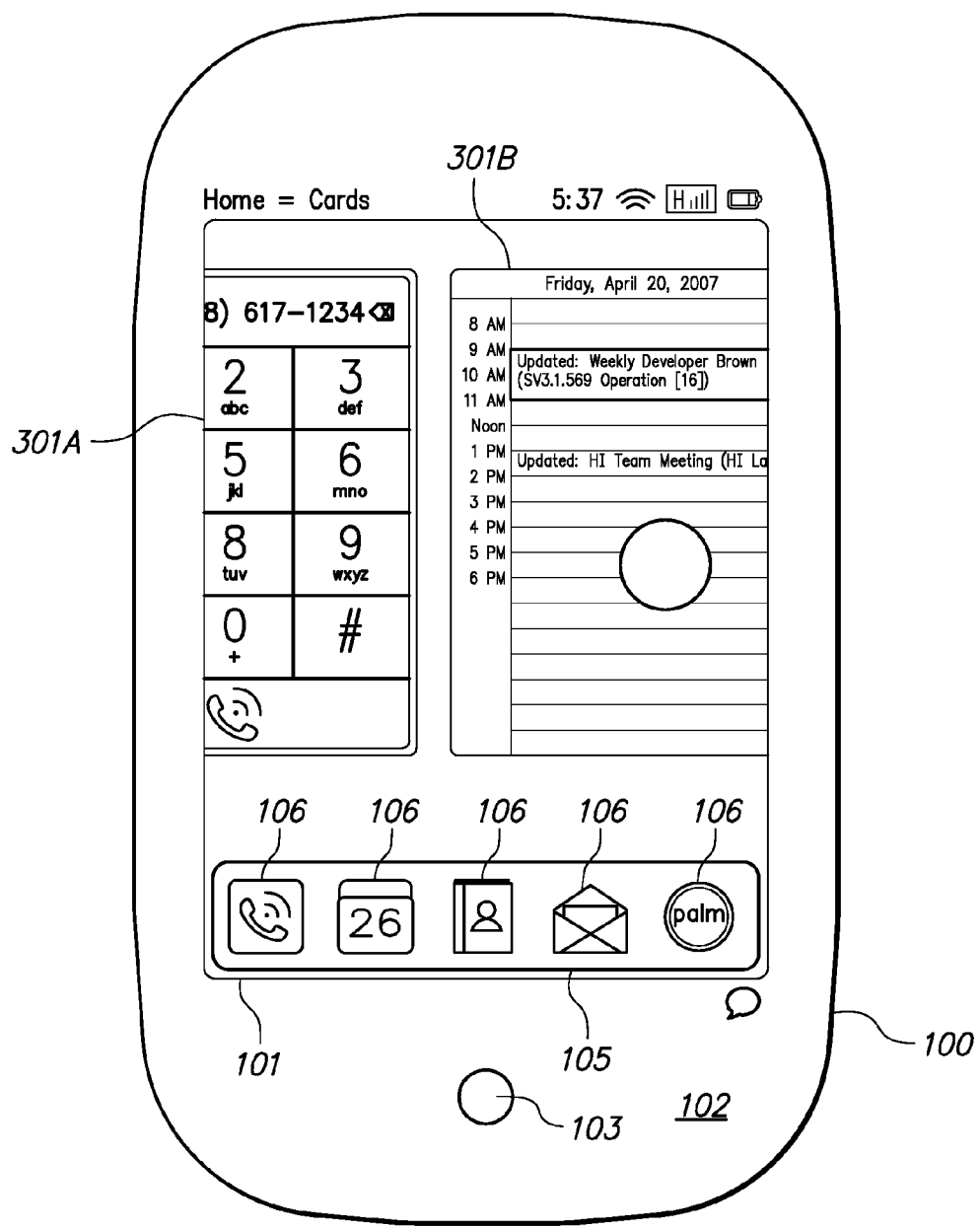
Figure 6D:
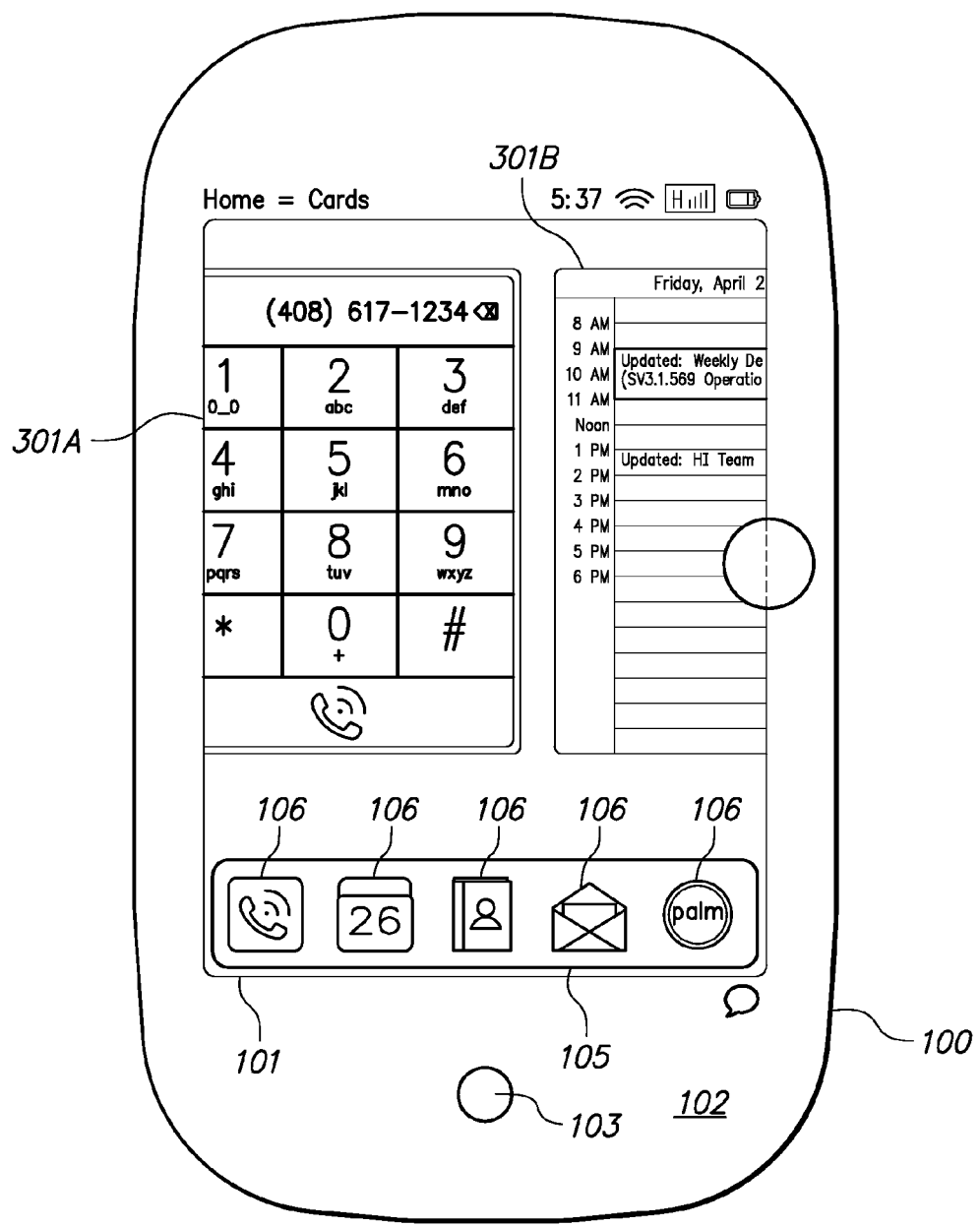
Figure 6E:
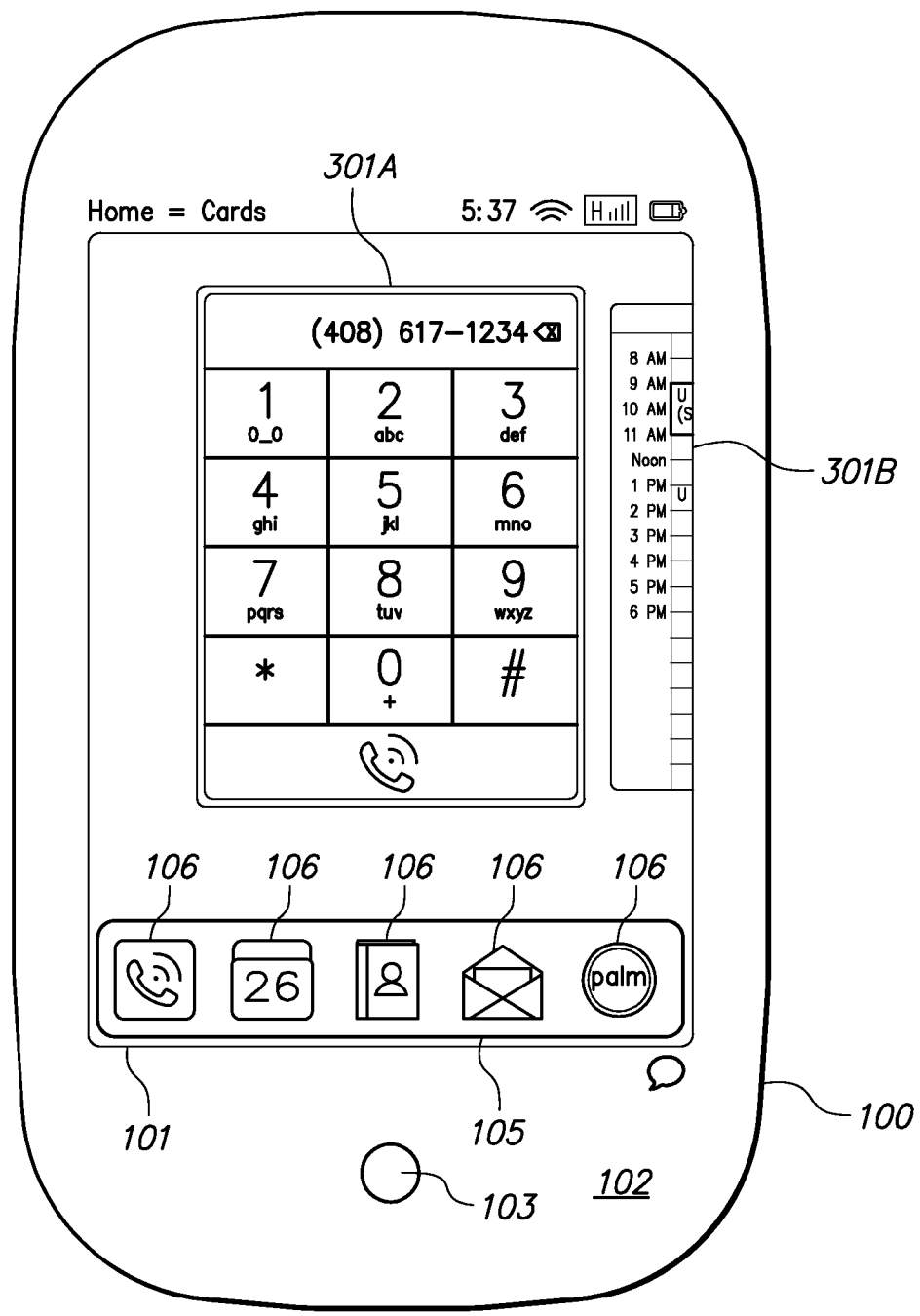

Referring now to FIGS. 6A through 6F, the operation of the invention is further illustrated by way of an example of a sequence for switching from one activity to another; specifically, the user switches from a calendar application to a telephone application. FIG. 6A shows an initial state in which device 100 shows a calendar application in full-screen mode. In FIG. 6B, the user has switched to windowed mode, for example by pressing button 103. Now, the calendar application is visible in window 301B, and the telephone application is partially visible in window 301A. FIGS. 6C through 6E show the effect of the user dragging window 301B in a rightward direction. As the user drags window 301B, window 301A also moves in a rightward direction, until it is centrally located in display screen 101, as shown in FIG. 6E. As discussed above, this motion can also be initiated in response to the user touching the visible portion of window 301A in FIG. 6B, or by dragging in a horizontal rightward direction in gesture area 102.

Figure 6F:

Once the telephone application is in the central position in window 301A as shown in FIG. 6E, the user can tap on window 301A or press button 103 to switch to full-screen mode, as shown in FIG. 6F. In one embodiment, the user can also interact with the telephone application directly in windowed mode as shown in FIG. 6E.

The user can launch additional activities by returning to the launch screen as shown in FIG. 1. In one embodiment, this is performed by performing a gesture or other command. In one embodiment, the user can also launch additional activities by touching an icon 106 in dock 105. In one embodiment, newly launched activities generate new windows that are added to the end of the sequence of windows shown in FIG. 7. In one embodiment, the window for the newly launched activity is, by default, given focus and presented in the central position on screen 101.

Figure 8B:
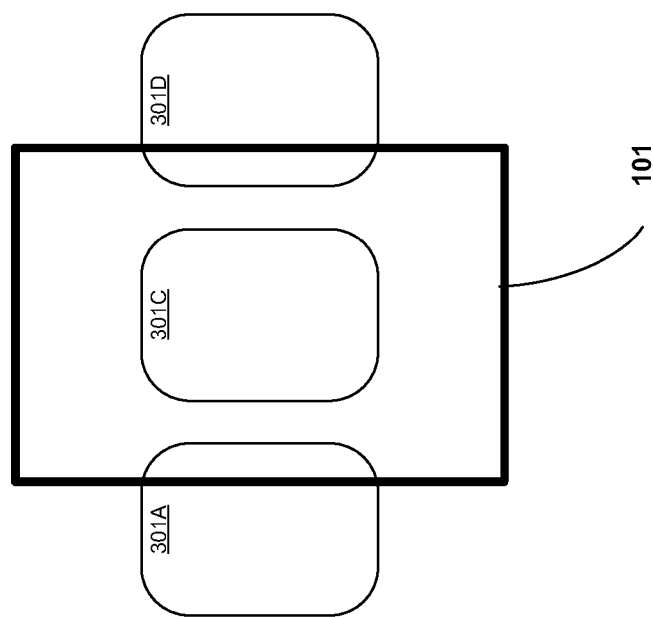
FIGS. 8A and 8B depict a sequence for dismissing an activity according to one embodiment of the present invention.
Figure 8A:
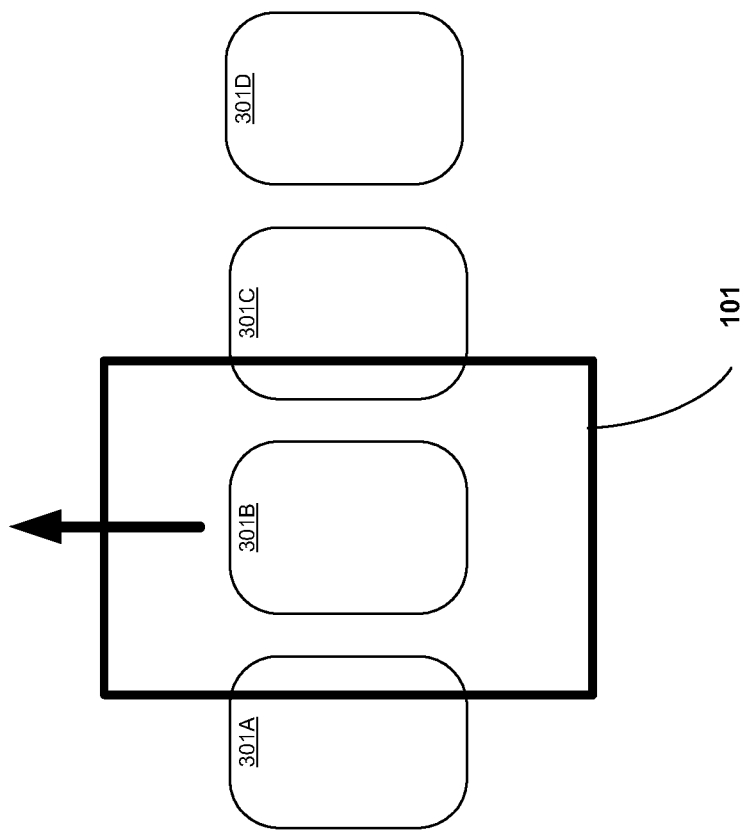

The user can dismiss applications, for example by closing a window 301. In one embodiment, a window 301 can be closed by clicking on a control within the window. In another embodiment, a window 301 can be closed by dragging the window upward off screen 101. Referring now to FIGS. 8A and 8B, there is shown an example of a sequence where the user drags window 301B upward off screen 101, causing window 301B to be dismissed.

As can be seen in FIGS. 8A and 8B, dismissing window 301B causes 301C to move leftward to fill in the gap caused by window 301B being dismissed. In general, when a window 301 is dismissed, other windows 301 move to fill the gap.

In one embodiment, dismissing a window 301 causes the application associated with the window to close. In another embodiment, the application remains open even when window 301 is closed.

In one embodiment, a window 301 might close automatically in certain circumstances. For example, if a task associated with an application is completed, or if an application crashes or terminates, the window 301 for the application can close automatically.

Figure 9A:
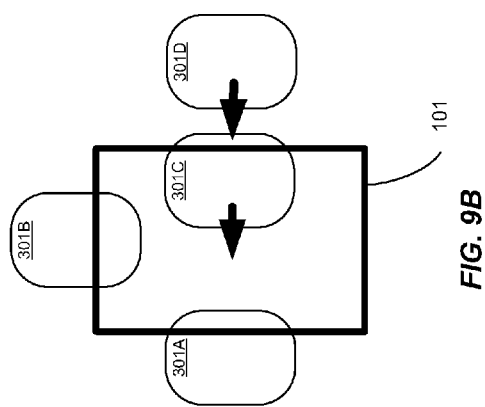
FIGS. 9A through 9D depict a sequence for rearranging activities according to one embodiment of the present invention.
Figure 9B:
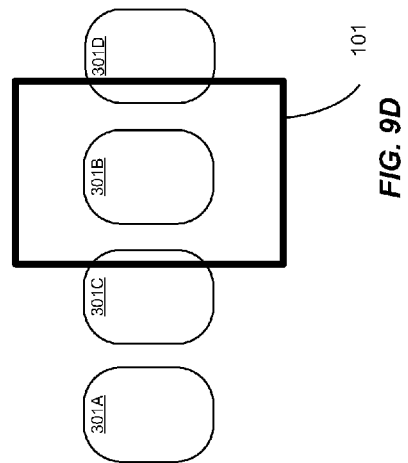
Figure 9C:
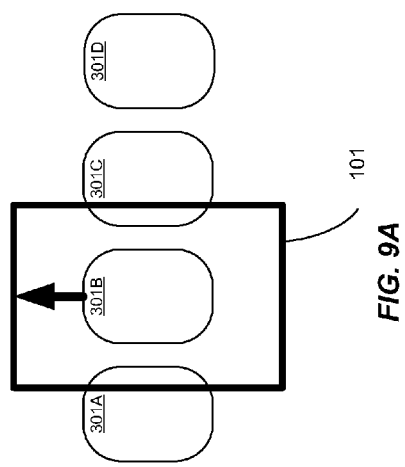
Figure 9D:
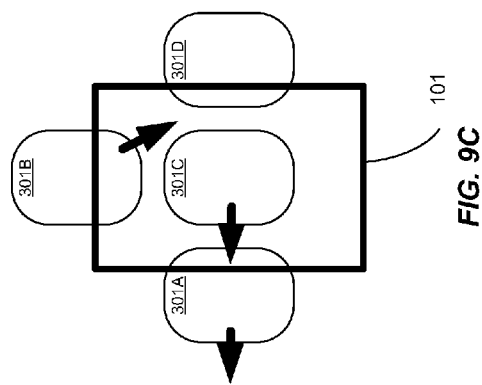

The user can also rearrange windows 301 manually when desired, by dragging a window 301 from one position to another. An example is shown in FIGS. 9A through 9D. The user drags window 301B upward, causing windows 301C and 301D to move to fill the gap. The user does not release window 301B however; instead, he or she moves window 301B into a position between windows 301C and 301D, as shown in FIG. 9C. The result is the sequence shown in FIG. 9D, where window 301B is now positioned between windows 301C and 301D.

In one embodiment, the user can resize windows 301 as desired. For example, the user can drag a corner of a window 301 to resize it, or can use two fingers to pinch the edges or corners of a window 301 to resize it.

To summarize, then, any or all of the following actions may be enabled for displayed windows 301:
  Press button 103: toggle between full-screen and windowed modes
  Drag window 301 left or right: cause windows to move left or right, and change focus
  Horizontal gesture in gesture area 102: cause windows to move left or right, and change focus
  Touch partially displayed window 301: cause window 301 to gain focus and move to center
  Touch (or double-tap) window 301 having focus: switch to full-screen mode
  Drag window 301 upward: dismiss window
  Drag window 301 downward: zoom out, causing more windows 301 to be shown concurrently on screen 101; the user can zoom back in by tapping any empty space The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment," "an embodiment," or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A mobile computing device, comprising:
   a touch-sensitive display screen;
   a processor; and
   a memory configured to store instructions that, when executed by the processor, cause the mobile computing device to operate in at least a full-screen mode and a windowed mode, wherein execution of the instructions further causes the mobile computing device, when operating in the windowed mode, to:
   generate a window corresponding to each of a plurality of running applications, wherein each window contains a live user interface for the corresponding running application;
   on the touch-sensitive display screen, display at least a portion of two or more of the generated windows along a horizontal axis in a linear arrangement;
   responsive to a first user gesture on the touch-sensitive display screen in a direction along the horizontal axis, move the two or more generated windows in concert with one another along the horizontal axis to cause a first window of the two or more generated windows to occupy a position formerly occupied by a second window of the two or more generated windows; and
   responsive to a second user gesture on the touch-sensitive display screen dragging upward on a target window of the two or more generated windows, move the target window off the display screen and close the running application corresponding to the target window.

2. The mobile computing device of claim 1, wherein execution of the instructions causes the mobile computing device to further:
   on the touch-sensitive display screen, display completely at least two windows of the two or more generated windows.

3. The mobile computing device of claim 1, wherein execution of the instructions causes the mobile computing device to further:
   on the touch-sensitive display screen, partially display at least three windows of the two or more generated windows.

4. The mobile computing device of claim 1, wherein execution of the instructions causes the mobile computing device to further:
   on the touch-sensitive display screen, display completely, between the displayed portions of first and second windows of the two or more generated windows, a third window of the two or more generated windows.

5. The mobile computing device of claim 1, wherein execution of the instructions causes the mobile computing device to further:
   responsive to a user input, cause the touch-sensitive display screen to toggle between the full-screen mode and the windowed mode, wherein the touch-sensitive display screen displays a live user interface for a single one of the running applications when operating in the full-screen mode.

6. The mobile computing device of claim 5, wherein the user input comprises the user pressing a button provided on the mobile computing device.

7. The mobile computing device of claim 5, wherein execution of the instructions causes the mobile computing device to further:
   display a transition effect when toggling between the full-screen mode and the windowed mode.

8. The mobile computing device of claim 5, wherein, in the full-screen mode, the displayed live user interface occupies substantially the entire touch-sensitive display screen.

9. The mobile computing device of claim 1, wherein execution of the instructions causes the mobile computing device to further:
   responsive to a trigger event, cause the touch-sensitive display screen to switch from the windowed mode to the full-screen mode, wherein the touch-sensitive display screen displays a live user interface for a single one of the running applications.

10. The mobile computing device of claim 9, wherein the trigger event comprises one selected from the group consisting of:
    interaction with an application; and
    a predetermined period of time elapsing since a user input.

11. The mobile computing device of claim 1, wherein execution of the instructions causes the mobile computing device to further:
    responsive to a third user gesture on the touch-sensitive display screen, cause the touch-sensitive display screen to change an order of displayed windows in the linear arrangement.

12. The mobile computing device of claim 1, wherein execution of the instructions causes the mobile computing device to further:
    responsive to an application being launched, add a window to the two or more generated windows, the added window corresponding to the launched application.

13. The mobile computing device of claim 1, wherein execution of the instructions causes the mobile computing device to further:
    cause the touch-sensitive display screen to display a window of the two or more generated windows having focus in a manner that is visually distinguishable from any displayed window not having focus.

14. The mobile computing device of claim 1, wherein execution of the instructions causes the mobile computing device to further:
  cause the touch-sensitive display screen to display a window of the two or more generated windows having focus at a larger size than any displayed window not having focus.

15. A method for navigating among a plurality of activities in a mobile computing device including a touch-sensitive display screen and configured to operate in at least a full-screen mode and a windowed mode, the method comprising:
  running a plurality of applications using a processor provided within the mobile computing device; and
  when the mobile computing device operates in the windowed mode:
    generating a window corresponding to each of a plurality of running applications, wherein each window contains a live user interface for the corresponding running application;
    on the touch-sensitive display screen, displaying at least a portion of two or more of the generated windows along a horizontal axis in a linear arrangement;
    responsive to a first user gesture on the touch-sensitive display screen in a direction along the horizontal axis, moving the two or more generated windows in concert with one another along the horizontal axis to cause a first window of the two or more generated windows to occupy a position formerly occupied by a second window of the two or more generated windows; and
    responsive to a second user gesture on the touch-sensitive display screen dragging upward on a target window of the two or more generated windows, moving the target window off the display screen and closing the running application corresponding to the target window.

16. The method of claim 15, further comprising:
  on the touch-sensitive display screen, displaying completely at least two windows of the two or more generated windows.

17. The method of claim 15, further comprising:
  on the touch-sensitive display screen, partially displaying at least three windows of the two or more generated windows.

18. The method of claim 15, further comprising:
  on the touch-sensitive display screen, displaying two partially-visible windows of the two or more generated windows and further displaying completely, between the two partially-visible windows, a third window of the two or more generated windows.

19. The method of claim 15, further comprising:
  responsive to a user input, toggling between the full-screen mode and the windowed mode, wherein the display screen displays a live user interface for a single one of the running applications when operating in the full-screen mode.

20. The method of claim 19, wherein the user input comprises the user pressing a button provided on the mobile computing device.

21. The method of claim 19, further comprising:
  displaying a transition effect when toggling between the full-screen mode and the windowed mode.

22. The method of claim 19, wherein, in the full-screen mode, the displayed live user interface occupies substantially the entire touch-sensitive display screen.

23. The method of claim 15, further comprising, responsive to a trigger event:
  on the touch-sensitive display screen, switching from a windowed mode wherein the touch-sensitive display screen displays at least a portion of the plurality of windows along the axis in the linear arrangement to a full-screen mode wherein the touch-sensitive display screen displays a live user interface for a single one of the applications.

24. The method of claim 23, wherein the trigger event comprises one selected from the group consisting of:
  interaction with an application; and
  a predetermined period of time elapsing since a user input.

25. The method of claim 15, further comprising, responsive to a third user gesture on the touch-sensitive display screen:
  on the touch-sensitive display screen, changing an order of displayed windows in the linear arrangement.

26. The method of claim 15, further comprising, responsive to an application being launched:
  adding a window to the two or more generated windows, the added window corresponding to the launched application.

27. The method of claim 15, wherein displaying at least a portion of the two or more generated windows comprises displaying, on the touch-sensitive display screen, a window of the two or more generated windows having focus in a manner that is visually distinguishable from any displayed window not having focus.

28. The method of claim 15, wherein displaying at least a portion of the two or more generated windows comprises displaying, on the touch-sensitive display screen, a window of the two or more generated windows having focus at a larger size than any displayed window not having focus.

29. The mobile computing device of claim 1, wherein execution of the instructions causes the mobile computing device to further:
  on the touch-sensitive display screen, display two windows of the two or more generated windows including the entire first window and at least a portion of the second window.

30. The method of claim 15, wherein displaying at least a portion of the two or more generated windows comprises, on the touch-sensitive display screen, displaying the entire first window and at least a portion of the second window.

31. The mobile computing device of claim 1, wherein each of the windows of the two or more generated windows represents activity related to the corresponding running application that is displayed in the full-screen mode.

32. The method of claim 15, wherein each of the windows of the two or more generated windows represents activity related to the corresponding running application that is displayed in the full-screen mode.

33. The mobile computing device of claim 1, wherein the live user interface in each of the windows of the two or more generated windows represents activity related to the corresponding running application that was displayed in full-screen mode, immediately before the switch to windowed mode or immediately before launching another application.

34. The method of claim 15, wherein the live user interface in each of the windows of the two or more generated windows represents activity related to the corresponding running application that was displayed in full-screen mode, immediately before the switch to windowed mode or immediately before launching another application.

35. The mobile computing device of claim 6, wherein the button is separate from the touch-sensitive display screen.

36. The method of claim 20, wherein the button is separate from the touch-sensitive display screen.

37. The mobile computing device of claim 1, wherein execution of the instructions to close the running application causes the mobile computing device to:
   move at least some of the two or more generated windows in concert with one another along the horizontal axis to cause a selected window of the two or more generated windows to occupy a position formerly occupied by the target window.

38. The method of claim 15, wherein closing the running application comprises:
   moving at least some of the two or more generated windows in concert with one another along the horizontal axis to cause a selected window of the two or more generated windows to occupy a position formerly occupied by the target window.

* * * * *